No. 752,951.                                                                                           Patented February 23, 1904.

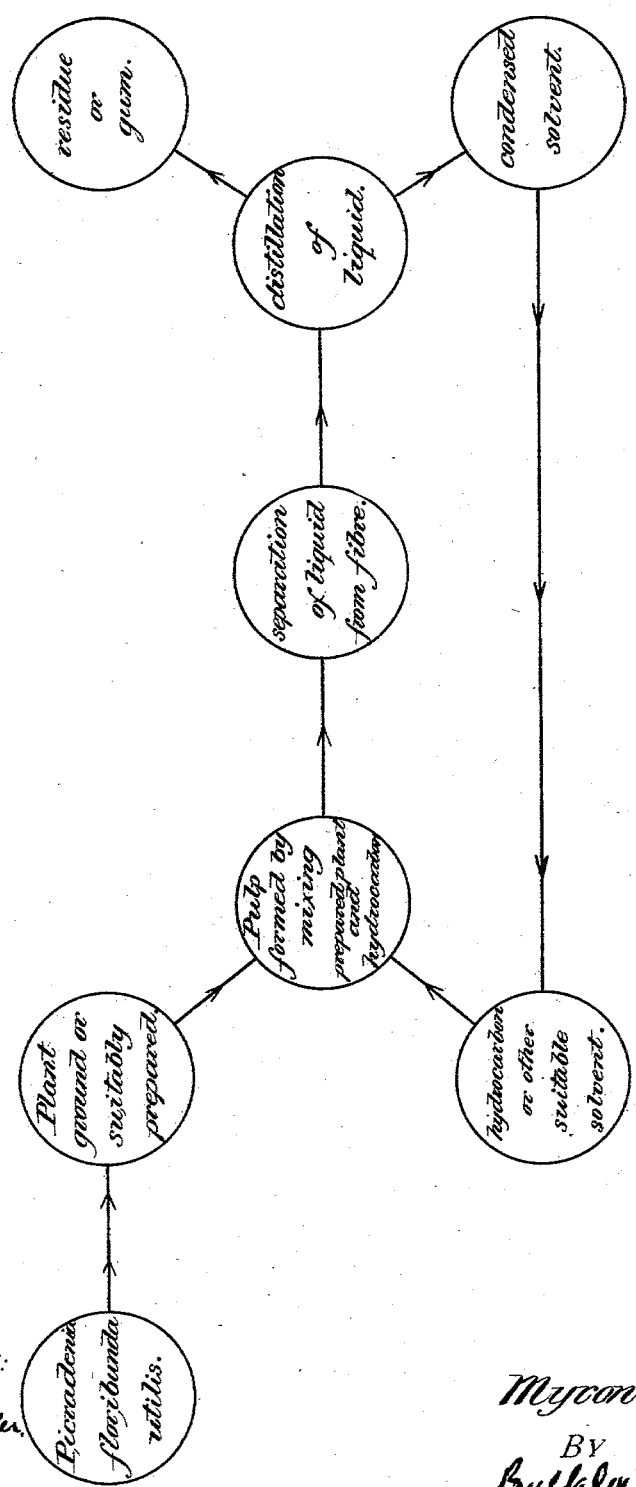

UNITED STATES PATENT OFFICE.

MYRON G. BROWNELL, OF DENVER, COLORADO.

RUBBER-LIKE GUM.

SPECIFICATION forming part of Letters Patent No. 752,951, dated February 23, 1904.

Application filed September 9, 1903. Serial No. 172,455. (No specimens.)

*To all whom it may concern:*

Be it known that I, MYRON G. BROWNELL, a citizen of the United States of America, residing in the city and county of Denver and State of Colorado, have invented a certain new and useful Rubber-Like Gum; and I do declare the following to be a full, clear, and exact description of the invention, such as will enable others skilled in the art to which it appertains to make and use the same.

My invention contemplates a new rubber-like gum adapted for use in various connections and for various purposes, chiefly as a substitute for caoutchouc, gutta-percha, and other like gums and manufactured from a particular plant or shrub, which plant or shrub has, so far as I am now aware, never before been employed for any useful purpose.

The particular plant or shrub for which I claim to be the first to propose utility and for the gummy portions of which in an agglomerated form I claim to be the first to propose a commercial and valuable use may be found in Colorado and is now since my discovery of it commonly known in this locality as the "Colorado rubber-plant." As the proper identification of this particular plant or shrub is a matter of importance, I have submitted specimens of the same to Professor T. D. A. Cockerell, of the Colorado College, and in a bulletin of the Colorado College Museum issued December 11, 1903, Professor Cockerell states as follows: "A good deal of interest has been aroused by the discovery that a native plant growing in the region around Buena Vista, Colorado, contains considerable quantities of rubber in its roots. Mr. F. R. Marsh, of Denver, has kindly supplied me with a good flowering specimen of the plant, which proves to be a *Picradenia* closely allied to a *P. floribunda,* (Gray,) Greene, part of the aggregate *Actinella Richardsoni* of *Gray's Synoptical Flora.* Although this plant has been collected on various occasions, it has been confused with *P. Richardsoni* and *floribunda,* from which it is at least subspecifically distinct. It may be described as follows: *Picradenia floribunda utilis,* N. Subsp., similar in appearance and mode of growth to *P. floribunda,* (a topotype collected by Heller at Santa Fe, New Mexico, compared,) but easily distinguished by the pale yellowish, broad, and subovate outer bracts, with strongly-concave outer margins and the back conspicuously keeled. These bracts are united about to the middle. (In *P. floribunda* these bracts are greener, long and pointed, with straight sides, and not united quite so far as the middle.) The disk corollas have a rusty-red ring in the throat, which appears to be absent in *floribunda;* rays narrower, about two millimeters in diameter. As far as the specimens seen go, the basal part of the stems is much more robust in *utilis* than *floribunda.* Compared with *P. macrantha* and *P. ligulæflora,* the rubber-plant differs conspicuously in its taller stature and smaller flowers. It is also readily distinguished from *P. Davidsoni* and the other described species of the genus. In *P. Davidsoni* (cotype examined) the outer bracts are narrower and shorter than the inner and the inner are much more pointed than those of *utilis.* The disk corollas of *Davidsoni* are considerably broader at the top than those of *utilis.* The length of the disk corollas in *Davidsoni* is three and one-half millimeters, in *utilis* and *floribunda* four, in *ligulæflora* five. In *P. ligulæflora* and *macrantha* the receptacle is hemispherical and somewhat fimbrillose, these species having in part the characters of *Gaillardia.* In *floribunda* and *utilis* the receptacle is conical and bare." I have therefore elected in the following description of my new article of manufacture, or "composition of matter," as it may be termed, and the process of making same and in the following claims to employ the name *Picradenia floribunda utilis* in referring to this plant or shrub, as this, I understand, is to become the recognized botanical name of the plant or shrub now commonly called the "Colorado rubber-plant," sometimes referred to as the "*Actinella Richardsoni.*"

In practicing my invention I first take a sufficient quantity of the plant *Picradenia floribunda utilis,* preferably only the root and crown of the plant, as only these portions appear to contain a high percentage of the gummy matter, although, of course, the entire plant can be employed, if desired. After the plant or shrub has been dried I then grind it up or disintegrate it in any suitable manner and with any suitable or appropriate machinery, the purpose of this step in the process being to convert the plant or shrub into powder-like, granulated, or comminuted material, as I find that by so doing the gummy portions of the plant are more readily and thoroughly extracted. The comminuted matter thus manufactured from the plant *Picradenia floribunda utilis* can then be placed in a solution composed, say, of alcohol and benzin or gasolene or other suitable hydrocarbon, the object being to thoroughly dissolve the gummy matter of the ground or comminuted material. In making the solution a few drops of alcohol are preferably added for every quart of benzin, gasolene, or other hydrocarbon employed. The hydrocarbon alone will insure a dissolving of the gummy matter of the plant *Picradenia floribunda utilis* reduced to the said ground or comminuted form; but a somewhat longer time is required with the hydrocarbon alone than when the alcohol is added. If alcohol is employed in the solution, I prefer to use the variety termed "wood-alcohol." The pulp-like mixture thus obtained by mixing the ground or comminuted material with the said solution is then preferably allowed to stand until the gummy portions of the ground or comminuted plant *Picradenia floribunda utilis* are thoroughly dissolved or extracted from the fiber of the plant. This may require from six to twenty-four hours, according to requirements or the conditions of particular cases. After this step in the process the liquid containing the gummy portions is preferably separated from the fiber of the comminuted material by any suitable means—as, for example, by suitable pressure applied in any suitable manner. I then subject the liquid holding the gummy matter in solution to suitable distillation, which leaves the gummy portions as a residue and in an agglomerated form or condition. The new rubber-like gum or waterproof gum or material thus produced constitutes a new article of manufacture, as it is capable of use in various connections and for various purposes—for example, as a substitute for rubber, caoutchouc, or gutta-percha, in the manufacture or treatment of various well-known articles of manufacture, or for any purpose for which it may be found suitable.

The accompanying drawing graphically indicates the several steps of the process employed in recovering the new product.

As thus manufactured from the plant *Picradenia floribunda utilis*, my new rubber-like gum is in the nature of a new article of manufacture or composition of matter, and when produced by the herein-described particular process it may be regarded as a new composition of matter consisting of the agglomerated gummy portions or elements of the plant or shrub called "*Picradenia floribunda utilis*" and referred to by other names, as hereinbefore described, and the residual portions of a volatile hydrocarbon solvent.

My invention, therefore, as stated, considered as a new product, article of manufacture, or composition of matter, consists of a rubber-like or waterproof gum resulting from the extraction and agglomeration of gummy portions of a particular plant—to wit, the plant *Picradenia floribunda utilis*, as explained.

I claim to be the first to in any suitable or desired manner extract and agglomerate the gummy portions of the plant *Picradenia floribunda utilis* into a useful manufacture or composition of matter.

The process of producing the plastic rubber-like body by comminuting the specified plant and agglomerating the gummy particles in the comminuted product into a coherent mass invented by me is not claimed in this particular application.

While the described process of recovering the gum is one which has been found efficient, it is to be understood that I may employ any process which will serve to produce the gum from the plant *Picradenia floribunda utilis*.

What I claim as my invention is—

1. As a new article of manufacture, a plastic, rubber-like body, consisting essentially of the gummy particles contained in the plant *Picradenia floribunda utilis*, separated and agglomerated into a coherent mass, insoluble in water but soluble in light hydrocarbons such as gasolene, substantially as described.

2. A new manufacture or composition of matter, consisting of a rubber-like and waterproof gum, said gum comprising the agglomerated gummy portions of the plant *Picradenia floribunda utilis* and the residual portions of a volatile hydrocarbon solvent, substantially as described.

In testimony whereof I affix my signature in presence of two witnesses.

MYRON G. BROWNELL.

Witnesses:
A. J. O'BRIEN,
DENA NELSON.